United States Patent
Lee

(10) Patent No.: US 9,559,626 B2
(45) Date of Patent: Jan. 31, 2017

(54) APPARATUS FOR CONTROLLING MOTOR IN ELECTRIC VEHICLE AND METHOD FOR PREVENTING OVERHEATING OF TRACTION MOTOR

(71) Applicant: LSIS CO., LTD., Anyang-si, Gyeonggi-do (KR)

(72) Inventor: Sun Woo Lee, Seoul (KR)

(*) Notice: Subject to any disclaimer, the term of this patent is extended or adjusted under 35 U.S.C. 154(b) by 0 days.

(21) Appl. No.: 14/645,087

(22) Filed: Mar. 11, 2015

(65) Prior Publication Data
US 2015/0263662 A1    Sep. 17, 2015

(30) Foreign Application Priority Data

Mar. 17, 2014 (KR) .................. 10-2014-0030953

(51) Int. Cl.
| | | |
|---|---|---|
| H02P 7/00 | (2016.01) | |
| H02P 23/14 | (2006.01) | |
| B60L 3/00 | (2006.01) | |
| B60L 3/06 | (2006.01) | |
| B60L 11/18 | (2006.01) | |
| B60L 15/00 | (2006.01) | |
| B60L 15/20 | (2006.01) | |

(52) U.S. Cl.
CPC ............. *H02P 23/14* (2013.01); *B60L 3/0061* (2013.01); *B60L 3/06* (2013.01); *B60L 11/1803* (2013.01); *B60L 11/1864* (2013.01); *B60L 15/007* (2013.01); *B60L 15/20* (2013.01); *H02P 29/032* (2016.02); *B60L 2240/423* (2013.01); *B60L 2240/425* (2013.01); *B60L 2240/429* (2013.01); *B60L 2260/167* (2013.01); *Y02T 10/645* (2013.01); *Y02T 10/7005* (2013.01); *Y02T 10/7061* (2013.01); *Y02T 10/72* (2013.01); *Y02T 10/7275* (2013.01)

(58) Field of Classification Search
CPC .... H02H 6/005; H02H 7/0852; B60L 15/2009
USPC ......................... 318/432, 434; 361/24, 25, 29
See application file for complete search history.

(56) References Cited

U.S. PATENT DOCUMENTS 5,934,398 A * 8/1999 Hotta .................... B60L 3/0023
                                                      180/65.31
6,446,745 B1    9/2002 Lee et al.
(Continued)

FOREIGN PATENT DOCUMENTS

| CN | 102343797 | 2/2012 |
| CN | 102556046 | 7/2012 |

(Continued)

OTHER PUBLICATIONS

European Patent Office Application Serial No. 15158751.6, Search Report dated Sep. 2, 2015, 7 pages.

(Continued)

*Primary Examiner* — Rina Duda

(57) ABSTRACT

Provided is a method for preventing overheating of a traction motor in an electric vehicle. The method for preventing the overheating of the traction motor in the electric vehicle includes identifying magnitude of an output load of the motor, identifying a loading time of the motor on the basis of the identified magnitude of the output load, comparing the identified loading time to a preset critical time, and controlling output torque of the motor according to the comparison result.

10 Claims, 10 Drawing Sheets

(56) References Cited

U.S. PATENT DOCUMENTS

| | | | | |
|---|---|---|---|---|
| 7,026,776 | B1* | 4/2006 | Walters | H02P 6/182 318/430 |
| 7,102,313 | B2* | 9/2006 | Kadota | B60W 20/15 180/65.1 |
| 8,089,234 | B2* | 1/2012 | Takizawa | B60L 15/00 318/139 |
| 2001/0015631 | A1* | 8/2001 | Shimane | B60L 15/2009 318/280 |
| 2013/0320747 | A1* | 12/2013 | Ozaki | B60L 3/0061 301/6.5 |

FOREIGN PATENT DOCUMENTS

| | | |
|---|---|---|
| CN | 102958745 | 3/2013 |
| CN | 103282257 | 9/2013 |
| EP | 2028759 | 2/2009 |
| JP | 06-245330 | 9/1994 |
| JP | 07-123504 | 5/1995 |
| JP | 07-298412 | 11/1995 |
| JP | 2003-079178 | 3/2003 |
| JP | 2005-086848 | 3/2005 |
| JP | 2006-158131 | 6/2006 |
| JP | 2006-254549 | 9/2006 |
| JP | 2006-296165 | 10/2006 |
| JP | 2007-202222 | 8/2007 |
| JP | 2007-282308 | 10/2007 |
| JP | 2008-187861 | 8/2008 |
| JP | 2008-199736 | 8/2008 |
| JP | 4412359 | 2/2010 |
| JP | 2012-075259 | 4/2012 |

OTHER PUBLICATIONS

The State Intellectual Property Office of the People's Republic of China Application Serial No. 201510208284.8, Office Action dated Aug. 24, 2016, 7 pages.

* cited by examiner

APPARATUS FOR CONTROLLING MOTOR IN ELECTRIC VEHICLE AND METHOD FOR PREVENTING OVERHEATING OF TRACTION MOTOR

CROSS-REFERENCE TO RELATED APPLICATIONS

Pursuant to 35 U.S.C. §119(a), this application claims the benefit of earlier filing date and right of priority to Korean Patent Application No. 10-2014-0030953, filed on Mar. 17, 2014, the contents of which are hereby incorporated by reference herein in its entirety.

BACKGROUND

The present disclosure relates to an electric vehicle, and more particularly, to a method for preventing overheating of a traction motor in an electric vehicle, which determines driving conditions of the traction motor in consideration of a temperature, magnitude of a load, a time for which a load is applied, and a variation in temperature to prevent the traction motor from being overheated.

Eco-friendly vehicles include pure electric vehicles and fuel-electric vehicles.

Such a fuel-electric vehicle represents a vehicle driven by efficiently combining two kinds of power sources different from each other, i.e., a vehicle driven by an engine that obtains a rotation force by burning a fuel (a fossil fuel such as gasoline) and a traction motor that obtains a rotation force by using a battery power.

Such an eco-friendly vehicle adopts a traction motor as a power source. Also, the eco-friendly vehicle is designed as a future vehicle that promotes reduction of exhaust gases and improvement of fuel efficiency. Thus, studies for improving fuel efficiency and developing eco-friendly products are being actively progressed to promptly meet the needs of the times.

However, in the eco-friendly vehicle using the traction motor as described above, overheating of the motor of which a temperature increases above a predetermined level during the driving of the motor may occur.

A driving section of the motor may be divided into a maximum instantaneous rated section and a continuous rated section. Since cooling capacity is greater than a heat generation rate below the continuous rating, the motor may continuously operate without increasing in temperature. However, when the motor operates for a long time above the continuous rating, the motor may increase in temperature.

When the temperature of the motor is identified in real time to increase above a predetermined level so as to prevent the motor from being overheated, technologies for restricting an operation of the motor in the driving section to prevent a system from being damaged due to the overheating are being applied.

That is, when the temperature of the motor exceeds a critical point, maximum torque may gradually decrease to enter into a derating section in which a rated output decreases. Since the driving amount of motor is significantly reduced in the state of entering into the derating section, an additional temperature rise may be prevented.

FIGS. 1 and 2 are line graphs illustrating a torque limitation in a derating section in which maximum torque gradually decreases when exceeding a critical temperature according to a related art.

Referring to FIG. 1, output torque of a motor is controlled according to a normal maximum torque value in a normal operation section in which a temperature of the motor is below a critical point. However, the maximum torque of the motor is set to gradually decrease in a derating section in which the temperature of the motor exceeds the critical point, thereby restricting a driving amount of motor.

Also, when the maximum torque of the motor decreases, a usable driving section of the motor may change to significantly reduce power performance of the vehicle. As a result, this may cause dissatisfaction of a driver.

Thus, in recent years, a derating method in which a motor protection critical temperature is additionally set, a driving amount of motor is reduced within a range in which power performance of the vehicle is not reduced above the motor protection critical temperature and below a critical temperature to prevent the motor from being overheated is used as illustrated in FIG. 2.

However, a temperature sensor of the traction motor is attached to a specific position of the traction motor. Here, a predetermined time is taken for completely transferring heat of the traction motor to the temperature sensor.

Thus, it is difficult to identify the overheated state of the traction motor by using only the temperature of the traction motor.

(Patent Document 1) KR2008-0026609 A

SUMMARY

Embodiments provide a method for preventing overheating of a traction motor in a vehicle, which determines driving conditions of the traction motor in consideration of magnitude of a load and a time for which a load is applied.

Embodiments also provide a method for preventing overheating of a traction motor in a vehicle, which determines driving conditions of the traction motor in consideration of magnitude of a load as well as a torque value under a condition in which an operation of the traction motor is limited.

Embodiments also provide a method for preventing overheating of a traction motor in a vehicle, which determines driving conditions of the traction motor in additional consideration of a temperature of the traction motor when the driving conditions of the traction motor are determined according to magnitude of a load and a time for which a load is applied.

Embodiments provide a method for preventing overheating of a traction motor in a vehicle, which determines driving conditions of the traction motor in consideration of a variation in temperature of the traction motor.

The objects of the present disclosure are not limited to the aforesaid, but other objects not described herein will be clearly understood by those skilled in the art from descriptions below.

In one embodiment, a method for preventing overheating of a traction motor in an electric vehicle includes: identifying magnitude of an output load of the motor; identifying a loading time of the motor on the basis of the identified magnitude of the output load; comparing the identified loading time to a preset critical time; and controlling output torque of the motor according to the comparison result.

The critical time may change according to the identified magnitude of the output load.

The controlling of the output torque of the motor may include: determining whether the loading time exceeds the critical time; and reducing an output torque value of the motor when the loading time exceeds the critical time.

The method may further include resetting the output torque value on the basis of an intensity of current flowing in the motor that is driven according to the reduced output torque value, wherein the resetting of the output torque value may include: comparing the current intensity at a previous time point to the current intensity at a present time point to identify a decreasing degree of the current intensity; identifying a decreasing rate of the reduced output torque; and additionally reducing the output torque value according to a difference when the difference between the identified decreasing rate of the output torque value and the identified decreasing degree of the current intensity occurs.

The method may further include detecting a temperature of the motor, wherein the critical time may change according to the detected temperature.

The critical time may increase or decrease in inverse proportion to the detected temperature.

The method may further include identifying a variation in temperature of the motor on the basis of a temperature of the motor, which is detected at a previous time point and a temperature of the motor, which is detected at a present time point, wherein the critical time may vary according to the temperature detected at the present time point and the identified temperature variation.

In another embodiment, an apparatus for controlling a motor of an electric vehicle includes: a motor; a current sensor detecting current supplied to the motor; and a control unit identifying magnitude of a load of the motor on the basis of the detected current, identifying a loading time of the motor on the basis of the identified load magnitude, comparing the identified loading time to a preset critical time, and controlling output torque of the motor according to the comparison result.

The control unit may change the critical time according to the identified load magnitude.

The control unit may determine whether the loading time exceeds the critical time, and when it is determined that the loading time exceeds the critical time, the control unit may reduce an output torque value of the motor.

The control unit may reset the output torque value on the basis of an intensity of current flowing in the motor that is driven according to the reduced output torque value.

The control unit may compare the current intensity at a previous time point to the current intensity at a present time point to identify a decreasing degree of the current intensity, identify a decreasing rate of the reduced output torque, and additionally reduce the output torque value according to a difference when the difference between the identified decreasing rate of the output torque value and the identified decreasing degree of the current intensity occurs.

The apparatus may further include a temperature sensor detecting a temperature of the motor, wherein the control unit may change the critical time according to the detected temperature.

The control unit may increase or decrease the critical time in inverse proportion to the detected temperature.

The control unit may identify a variation in temperature of the motor on the basis of a temperature of the motor, which is detected at a previous time point and a temperature of the motor, which is detected at a present time point to change the critical time according to the temperature detected at the present time point and the identified temperature variation.

The details of one or more embodiments are set forth in the accompanying drawings and the description below. Other features will be apparent from the description and drawings, and from the claims.

DETAILED DESCRIPTION OF THE EMBODIMENTS

The following description will exemplify the principle of the present invention. Therefore, although not described and illustrated clearly in this specification, the principle of the present invention may be embodied and various apparatuses included in the concept and scope of the present invention may be invented by those skilled in the art. Conditional terms and embodiments enumerated in this specification are clearly intended only to make the concept of the present invention understood. Furthermore, it should be understood that the present invention is not limited to the enumerated embodiments and states.

Furthermore, it should be understood that all detailed descriptions in which specific embodiments as well as the principle, viewpoint, and embodiments of the present invention are enumerated are intended to include structural and functional equivalents. Furthermore, it should be understood that such equivalents include all elements which are developed to perform the same function as equivalents to be invented in the future as well as currently-known equivalents, that is, regardless of the structure.

Figure 1:
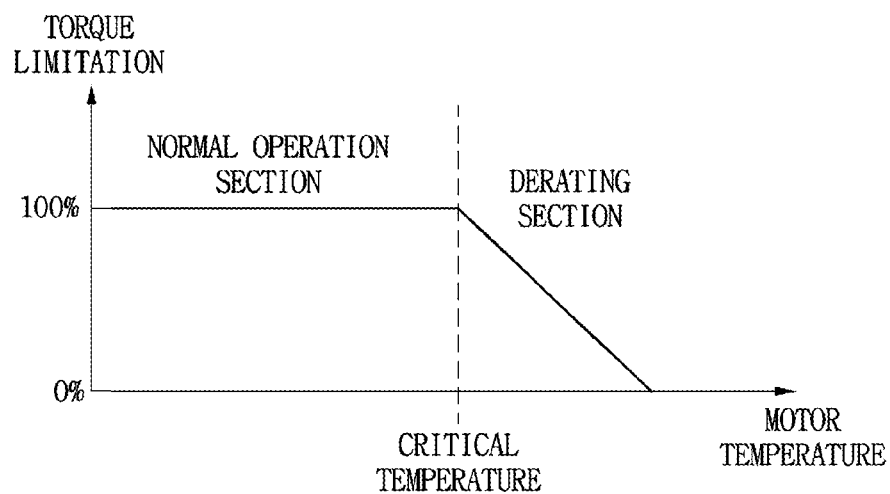
FIGS. 1 and 2 are line graphs illustrating a torque limitation in a derating section in which maximum torque gradually decreases when exceeding a critical temperature according to a related art.
Figure 2:
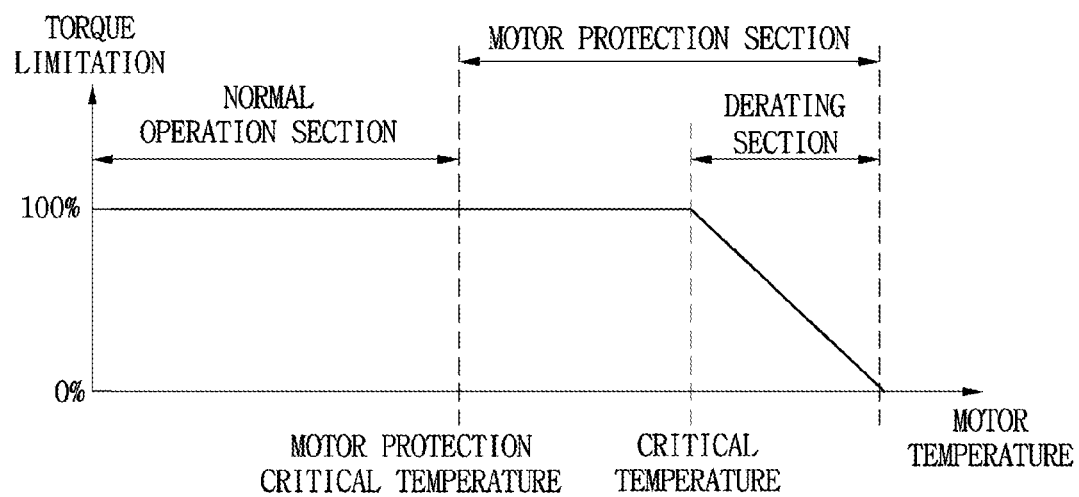
Figure 3:
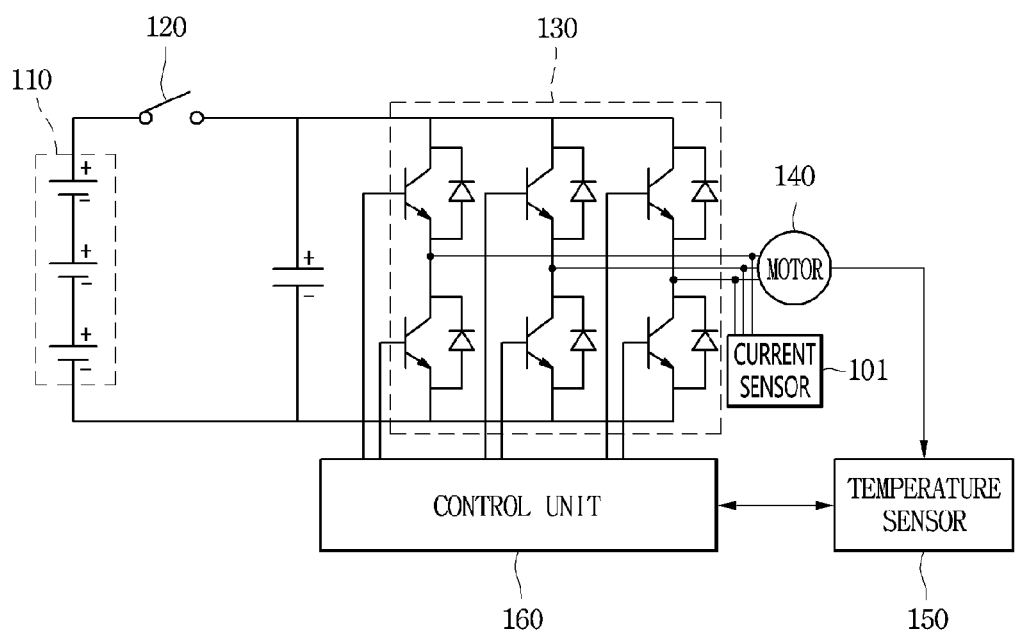
FIG. 3 is a view of an electric vehicle according to an embodiment.

FIG. 3 is a view of an electric vehicle according to an embodiment.

Referring to FIG. 3, an electric vehicle includes a battery 110, a main relay 120, an inverter 130, a motor 140, a temperature sensor 150, and a control unit 160.

Here, although the temperature sensor 150 is illustrated in the drawings, the temperature sensor 150 may be one of a plurality of sensors provided in the electric vehicle. Thus, the electric vehicle may include other additional sensors in addition to the temperature sensor. For example, the electric vehicle may further include a current sensor 101 for detecting an intensity of current supplied into the motor 140.

The battery 110 may supply a driving power to an electric driving movable body (for example, the electric vehicle).

Particularly, the battery 110 may supply a DC current to a DC terminal capacitor disposed within the inverter 130. The battery 110 may be a high voltage battery. The battery may be provided as an assembly of a plurality of unit cells.

The plurality of unit cells may be managed by an electronic control unit (e.g., a battery management system (BMS)) to maintain a predetermined voltage. The battery 110 may emit a predetermined DC power under the control of the electronic control unit (not shown).

Also, the electronic control unit may detect a voltage of the battery 110 to transmit the detected voltage value to a control unit 160 that will be described later.

The battery 110 may be provided as a secondary battery that is changeable into a charging state and discharge state according to an operation state thereof.

The main relay 120 is disposed on a predetermined power line connected to the battery 110 to interrupt the DC power outputted through the battery 110.

In the drawings, although only one main relay is disposed on the power line, the present disclosure is not limited thereto. For example, the number of main relays 120 disposed on the power line may increase.

For example, the main relay may include a first main relay connected to a positive terminal to interrupt the DC power and a second main relay connected to a negative terminal to interrupt the DC power.

The inverter 130 may receive the DC power from the battery 110 according to a switched state of the main relay 120.

Also, the inverter 130 may convert the DC power supplied from the battery 110 into an AC power to supply the converted AC power to the motor 140.

The AC power converted by the inverter 130 may be a 3-phase AC power.

Particularly, the inverter 130 may include an insulated gate bipolar transistor. The inverter 130 may perform pulse width modulation (PWM) switching according to a control signal applied to an inverter control unit 160 that will be described later to phase-convert the DC power supplied from the battery 110, thereby supplying the converted DC power to the motor 140.

The motor 140 includes a stator (not shown) that is fixed, but does not rotate and a rotor (not shown) that rotates. The motor receives the AC power supplied through the inverter 130.

The motor 140 may be, for example, a 3-phase motor. When a voltage-variable/frequency-variable AC power is applied to a coil of the stator in each phase, a rotation rate of the rotor may be variable according to an applied frequency.

The motor 140 may include an induction motor, a blushless DC (BLDG) motor, a reluctance motor, and the like.

A driving gear (not shown) may be disposed on one side of the motor 140. The driving gear converts rotation energy of the motor according to a gear ratio thereof. The rotation energy outputted from the driving gear may be transmitted to a front wheel and/or rear wheel to allow the electronic to move.

Although not shown, the electronic vehicles may further include an electronic controller for controlling overall electronic devices of the electric vehicle. The electronic controller (no shown) may control each of the devices so that each of the devices operates or is displayed. Also, the electronic controller may control the above-described battery management system.

Also, the electronic controller may generate operation command values according to various operation modes (a driving mode, a rear mode, an idle mode, and a packing mode) on the basis of detection signals transmitted from a tilt angle detection unit (not shown) for detecting a tilt angle of the electric vehicle, a speed detection unit (not shown) for a speed of the electric vehicle, a brake detection unit (not shown) for detecting an operation of a brake pedal, and an accelerator detection unit (not shown) for detecting an operation of an accelerator. Here, the operation command values may be, for example, a toque command value or a speed command value.

The electric vehicle according to an embodiment may include a pure electric vehicle using the battery and motor and a hybrid electric vehicle using the battery and motor as wall as an engine.

Here, the hybrid electric vehicle may further include a switching unit for selecting at least one of the battery and the engine and a transmission. The hybrid electric vehicle may be classified into a series type electric vehicle in which mechanical energy outputted from the engine is converted into electrical energy to drive the motor and a parallel type electric vehicle in which mechanical energy outputted from the engine and electrical energy outputted from the battery are used as the same time.

The temperature sensor 150 acquires information corresponding to a driving state of the motor 140.

Particularly, the temperature sensor 150 may be attached to at least one side of the motor 140 to detect a temperature that increases by heat of the motor 140.

That is to say, the temperature sensor 150 detects a temperature of the motor 140.

Also, the electric vehicle may further include a current sensor 101 for detecting current supplied to the motor 140 according to the driving state of the motor 140 as described above.

The current sensor 101 may detect 3-phase current values (i.e., a u-phase current value, a v-phase current value, and a w-phase current value) supplied to the motor 140 to transmit the 3-phase current values to the control unit 160.

The control unit 160 controls an overall operation of the inverter 130.

For example, the control unit 160 may determine driving conditions of the motor 140 and calculate a driving value for driving the motor 140 according to the determined driving conditions to generate a switching signal for controlling the inverter 130 (preferably, for switching control of IGBT constituting the inverter) according to the calculated driving value.

Thus, the inverter 130 selectively performs an ON/OFF operation according to the switching signal generated through the control unit 160 to convert the DC power supplied from the battery 110 into the AC power.

The control unit 160 may change the driving conditions of the motor 140 by using the magnitude (e.g., a torque value) according to the power supplied to the motor 140 and a time (for which a load is applied) for which the power is supplied to the motor under the load.

Also, when the driving conditions of the motor 140 change, the control unit 160 may not change the driving conditions of the motor 140 in consideration of only the torque value, but identify the current intensity according to a change of the torque value to change the torque value on the basis of the identified current intensity.

Also, when the torque value enters into an output limitation state that corresponds to a reduction condition of the torque value, the control unit 160 may vary a critical time with respect to a loading time for entering into the output limitation state according to the temperature of the motor 140.

Also, the control unit 160 may vary the critical time to be compared to the loading time according to a variation in temperature of the motor 140 to change the driving conditions of the motor, thereby matching the current external environments.

Hereinafter, an operation of the control unit 160 will be described in detail with reference to the accompanying drawings.

Figure 4:
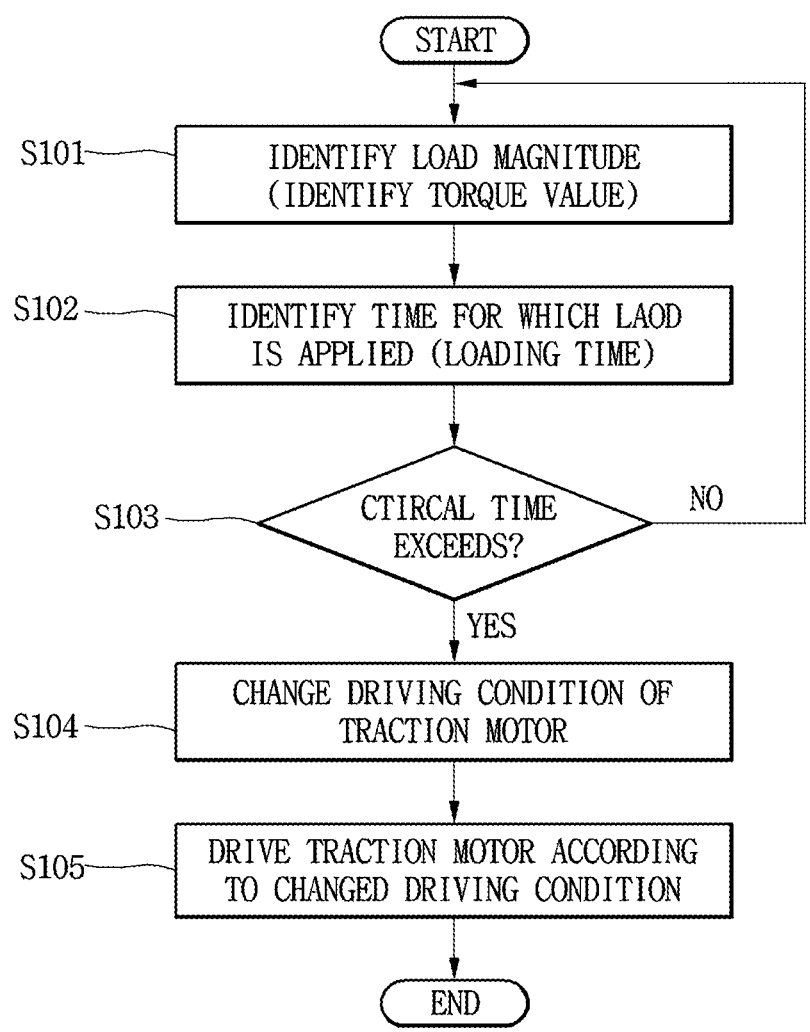
FIG. 4 is a flowchart for explaining a method for preventing overheating of a traction motor in an electric vehicle in stages according to a first embodiment.
Figure 5:
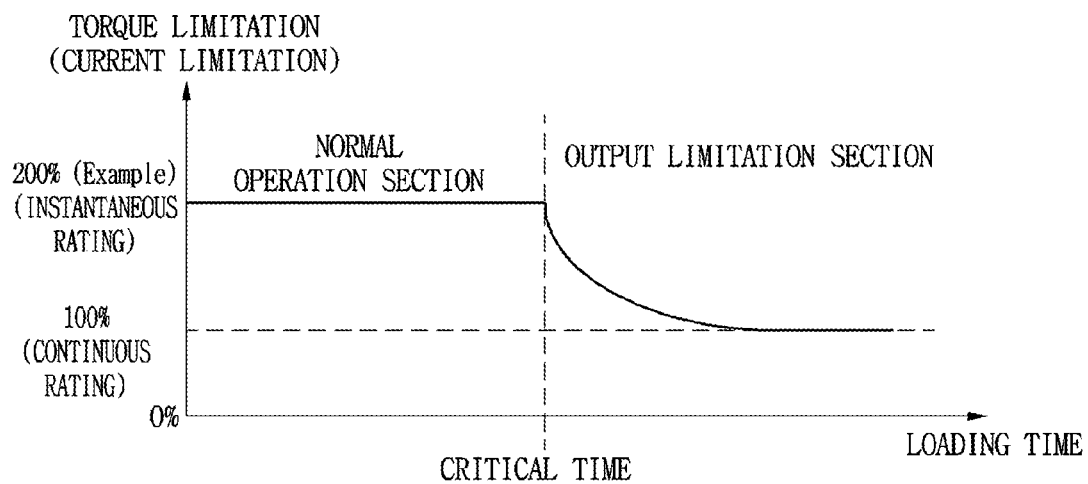
FIG. 5 is a line graph illustrating torque limitation in an output limitation section in which maximum torque gradually decreases according to the first embodiment.
Figure 6:
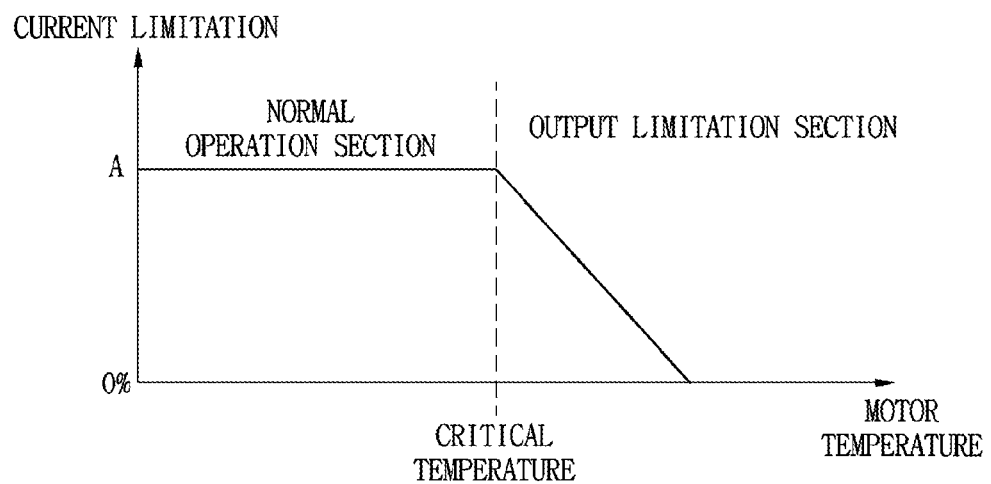
FIG. 6 is a view illustrating a current condition for determining a decrement of torque according to the first embodiment.
Figure 7:
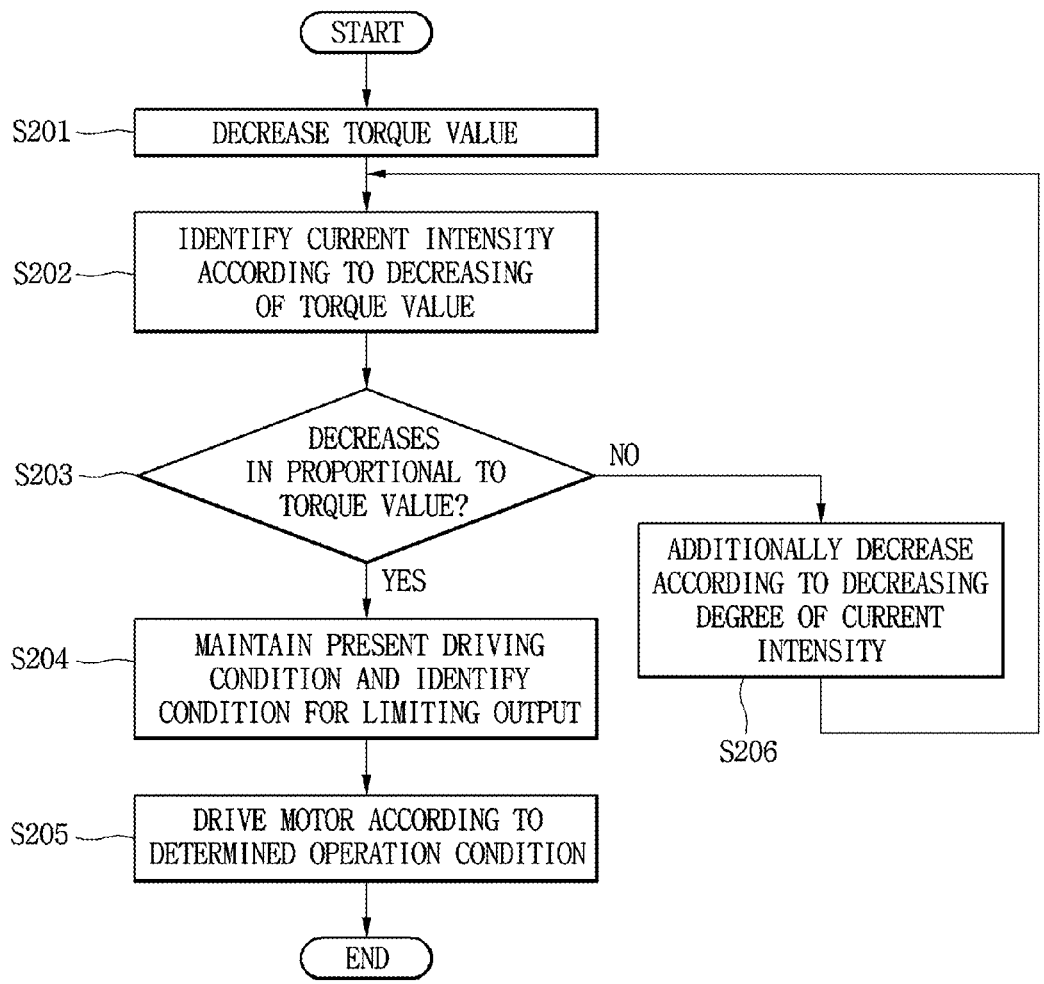
FIG. 7 is a flowchart for explaining a method for determining driving conditions in stages in FIG. 6.

FIG. 4 is a flowchart for explaining a method for preventing overheating of a traction motor in an electric vehicle in stages according to a first embodiment, FIG. 5 is a line graph illustrating a torque limitation in an output limitation section in which maximum torque gradually decreases according to the first embodiment, FIG. 6 is a view illustrating a current condition for determining a decrement of torque according to the first embodiment, and FIG. 7 is a flowchart for explaining a method for determining driving conditions in stages in FIG. 6.

Referring to FIG. 4, in operation S101, a control unit 160 identifies magnitude of a load. Here, the load magnitude may be information corresponding to driving conditions of a motor 140.

For example, the load magnitude may be intensity of current supplied to the motor 140, i.e., output torque (a torque value) of the motor 140.

That is, an operation section of the motor 140 may be divided into a maximum instantaneous rated section and a continuous rated section. An increasing rate of the temperature of the motor 140 may be significantly reduced below continuous rating, and also the motor may continuously operate without increasing in temperature below the continuous rating. However, when the motor operates for a long time above the continuous rating, the motor 140 may quickly increase in temperature.

The maximum instantaneous rating and continuous rating may represent the torque values.

Thus, a control unit 160 may identify a torque value that corresponds to a present output condition of the motor 140.

In operation S102, when the load magnitude is identified, the control unit 160 identifies how long does operate the motor 140 at the identified load magnitude. That is, the control unit 160 identifies a time (a loading time) for which the load is applied.

Thereafter, in operation S103, the control unit 160 determines whether the identified loading time exceeds a preset critical time.

Here, the critical time may have values different from each other according to the magnitude of the load. That is, even though the motor 140 continuously operates at a specific load magnitude for the critical time, if the specific load magnitude is reasonable to the motor 140, a condition in which a temperature of the motor 140 is maintained within a normal range may be satisfied.

For example, even though the motor 140 continuously operates at the maximum instantaneous rating for about 10 minutes, the motor may not increase in temperature. However, if the 10 minutes elapses, the motor may significantly increase in temperature. Here, a critical time corresponding to the load magnitude at the maximum instantaneous rating may be set to about 10 minutes.

Also, the critical time may be differently determined according to the torque value (load magnitude). For example, when the torque value increases, the critical time may decrease. On the other hand, when the torque value decreases, the critical time may increase. That is, the critical time and the torque value may be in inverse proportion to each other.

Thereafter, in operation S104, if the identified loading time exceeds the critical time, the driving conditions of the motor 140 changes.

That is, when the motor 140 continuously operates with the present set torque value, the control unit 160 reduces the present set torque value because the increase of the temperature of the motor 140 is inevitable, and a risk due heat of the motor 140 exists.

Here, the decreasing degree of the torque value may vary according to the identified loading time. For example, if a difference between the loading time and the critical time is large (if the loading time significantly exceeds the critical time), the decreasing degree of the torque value may increase. On the other hand, if the loading time is nearly equal to the critical time, the decreasing degree of the torque value may decrease.

Referring to FIG. 5, as described above, if the motor 140 operates at about 200% of the maximum instantaneous rating, the control unit 160 may maintain the present set driving conditions of the motor 140 for the loading time corresponding to the critical time.

Also, when the motor 140 operates for the loading time exceeding the critical time under the maintained driving conditions, the control unit may reduce the torque value (for example, 200%→150%).

As illustrated in FIG. 5, the change of the driving conditions may be performed by using only the torque value as described above. On the other hand, the intensity of the current may be limited.

That is, as described above, the current having the intensity corresponding to a reference symbol A may be supplied to the motor 140. Thus, when the change of the driving conditions due to the entering into the output limitation section is needed, the intensity of the current supplied to the motor 140 may decrease (a value less than the reference symbol A).

That is to say, the torque value and the intensity of the current may be linearly proportional to each other. This means that the intensity of the current decreases by a reference symbol Y less than a reference symbol X even though the torque value decreases by the reference symbol X.

Thus, in the current embodiment, a variation in current intensity due to the reduction of the torque value may be identified. If the variation in current intensity corresponds to a reduction rate of the torque value, the present decreasing torque value may be maintained as it is. On the other hand, if a difference between the variation in current intensity and the reduction rate of the torque value is very large, the torque value may additionally change.

This will be described with reference to FIG. 7.

Referring to FIG. 7, in operation S201, when the loading time exceeds the preset critical time, the control unit 160 reduces the torque value on the basis of the present load magnitude and the different between the loading time and the critical time.

That is, the control unit 160 may reduce a first torque value to a second torque value less than the first torque value.

Thereafter, in operation S202, the control unit 160 identifies a current intensity due to the reduction of the torque value. That is, as the torque value decreases, the current intensity may decrease. Here, the control unit 160 may identify the decreasing intensity of the current. The intensity of the current may be detected by a current sensor 101.

In operation S203, the control unit 160 determines whether the intensity of the current also decrease to correspond to the decreasing rate of the torque value on the basis of the identified intensity of the current.

That is, the control unit 160 determines whether a difference between the first torque value and the second torque value corresponds to a difference between a current value when the first torque value is applied and a current value when the second torque value is applied.

Thereafter, in operation S204, if it is determined that the intensity of the current decrease to correspond to the decreasing rate of the torque value, a condition for limiting an output is identified while the present driving conditions is maintained.

In operation S205, the control unit 160 drives the motor 140 according to the identified condition.

In operation S206, if it is determined that the decreasing intensity of the current is different from the decreasing rate of the torque value, the torque value may additionally decrease according to the decreasing degree of the current intensity.

That is, if the current intensity does not decrease in the state where the torque value decreases, the torque value may additionally decrease to reduce the intensity of the current.

Figure 8:
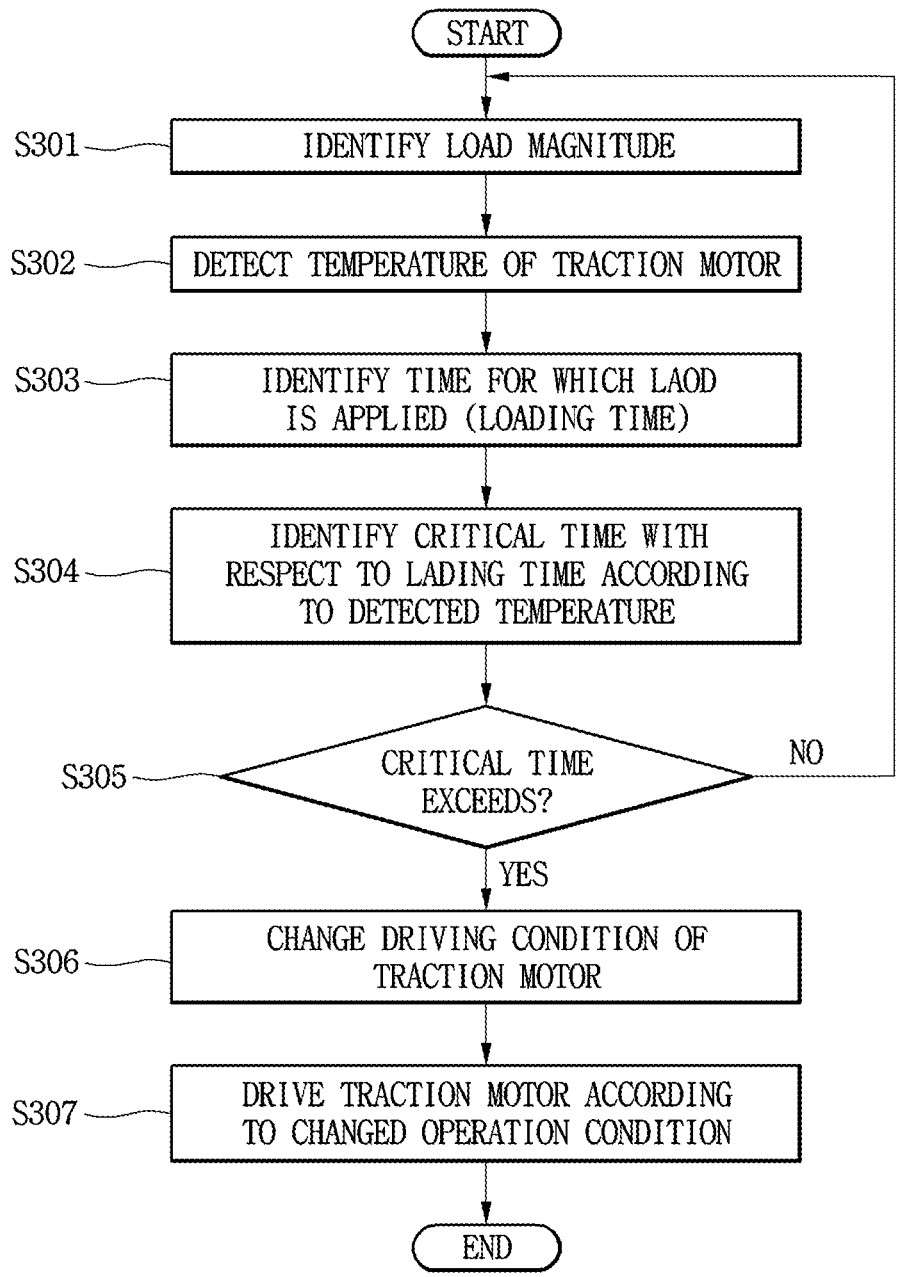
FIG. 8 is a flowchart for explaining a method for preventing overheating of a traction motor in an electric vehicle in stages according to a second embodiment.
Figure 9:
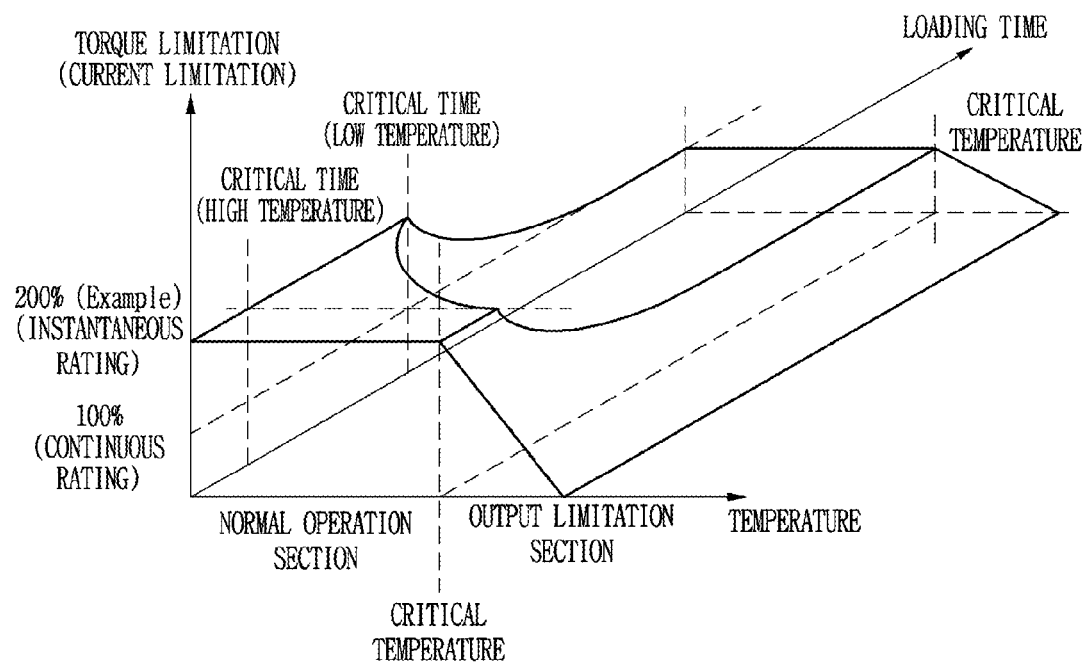
FIGS. 9 and 10 are line graphs illustrating a torque limitation in an output limitation section in which maximum torque gradually decreases according to the second embodiment.
Figure 10:
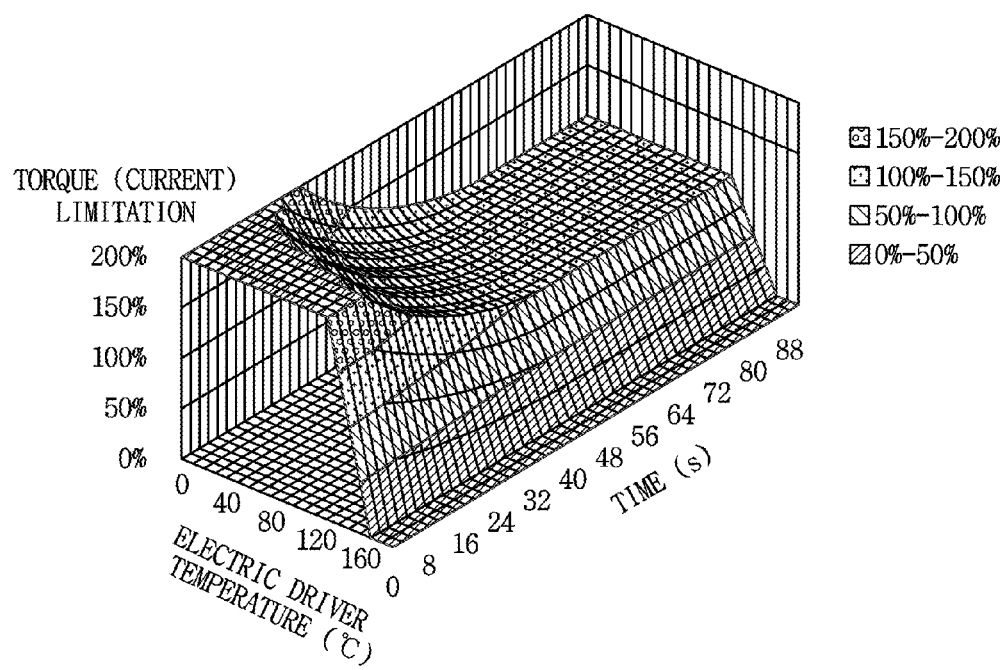
Figure 11:
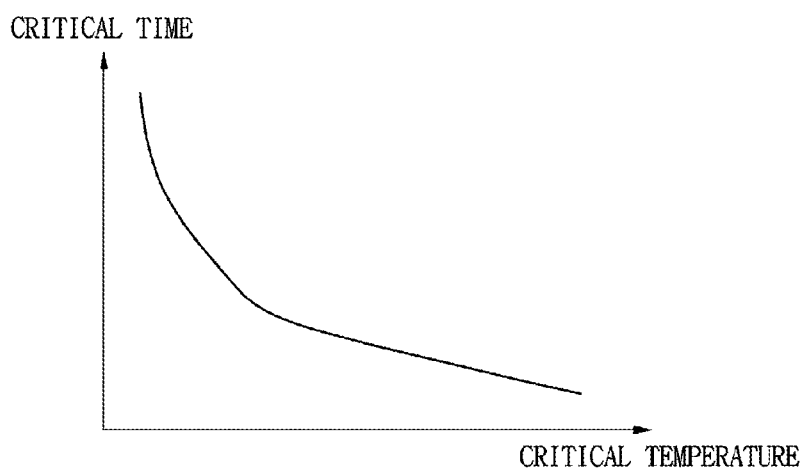
FIG. 11 is a view illustrating a relationship between a temperature of the motor and a critical time according to the second embodiment.

FIG. 8 is a flowchart for explaining a method for preventing overheating of a traction motor in an electric vehicle in stages according to a second embodiment, FIGS. 9 and 10 are line graphs illustrating a torque limitation in an output limitation section in which maximum torque gradually decreases according to the second embodiment, and FIG. 11 is a view illustrating a relationship between a temperature of the motor and a critical time according to the second embodiment.

Referring to FIG. 8, in operation S301, a control unit 160 identifies magnitude of a load. Here, the load magnitude may be information corresponding to driving conditions of a motor 140.

For example, the load magnitude may be intensity of current supplied to the motor 140, i.e., output torque (a torque value) of the motor 140.

That is, an operation section of the motor 140 may be divided into a maximum instantaneous rated section and a continuous rated section. An increasing rate of the temperature of the motor 140 may be significantly reduced below continuous rating, and also the motor may continuously operate without increasing in temperature below the continuous rating. However, when the motor operates for a long time above the continuous rating, the motor 140 may quickly increase in temperature.

The maximum instantaneous rating and continuous rating may represent the torque values.

Thus, a control unit 160 may identify a torque value that corresponds to an present output condition of the motor 140.

Also, in operation S302, the control unit 160 identifies a temperature of the motor 140, which is detected through a temperature sensor 150.

In operation S303, when the load magnitude and the temperature are identified, the control unit 160 identifies how long does operate the motor 140 at the identified load magnitude. That is, the control unit 160 identifies a time (a loading time) for which the load is applied.

Thereafter, in operation S304, the control unit 160 identifies a critical time for limiting an output of the motor 140 according to the identified load magnitude and temperature.

Here, in the first embodiment, the critical time may be simply determined by the load magnitude.

However, in the second embodiment, the critical time may be determined by the load magnitude and the present temperature of the motor 140.

For example, the critical time may be differently applied by being divided into a low temperature and a high temperature of the motor 140. That is, when the motor 140 has a low temperature, even though the maximum load is applied, a range of the increasing temperature of the motor 140 is greater than that of the increasing temperature of the motor 140 having a high temperature. Thus, the critical time may increase. Also, when the motor 140 has the high temperature, even though the maximum load is applied for a short time, a range of the increasing temperature of the motor 140 may increases to reduce the critical time.

That is to say, if the motor 140 has the high temperature under the same load magnitude, the critical time may decrease to correspond to the high temperature. On the other hand, if the motor 140 has the low temperature, the critical time may increase to correspond to the low temperature.

Thereafter, in operation S305, the control unit 160 determines whether the loading time exceeds the critical time on the basis of the identified critical time.

Also, the critical time may have values different from each other according to the magnitude of the load as wall as the temperature. That is, even though the motor 140 continuously operates at a specific load magnitude for the critical time, if the specific load magnitude is reasonable to the motor 140, a condition in which a temperature of the motor 140 is maintained within a normal range may be satisfied.

Thereafter, in operation S306, if the identified loading time exceeds the critical time, the driving conditions of the motor 140 changes.

That is, when the motor 140 continuously operates with the present set torque value, the control unit 160 reduces the present set torque value because the increase of the temperature of the motor 140 is inevitable, and a risk due heat of the motor 140 exists.

Here, the decreasing degree of the torque value may vary according to the identified loading time. For example, if a difference between the loading time and the critical time is large (if the loading time significantly exceeds the critical time), the decreasing degree of the torque value may increase. On the other hand, if the loading time is nearly equal to the critical time, the decreasing degree of the torque value may decrease.

In operation S307, the control unit 160 drives the motor 140 according to the determined driving conditions.

That is, referring to FIGS. 9 and 10, in the second embodiment, the torque limitation and current limitation may not be realized on the basis of the critical time according to the load magnitude and loading time, but be realized by comparing the critical time to the loading time which vary according to the load magnitude and the temperature of the motor 140.

Also, if the motor has the high temperature under the same load magnitude, the changing torque value (the maximum torque value due to the limitation of the maximum torque) may decrease to correspond to the high temperature of the motor 140.

Also, referring to FIG. 10, the critical time and the motor temperature may be in inverse proportion to each other.

That is, when the motor temperature increases, the critical time may decrease to correspond to the high temperature. Thus, even though the motor operates for a short loading time under the same load magnitude, the torque limitation and current limitation may be performed.

On the other hand, when the motor temperature decreases, the critical time may decrease to correspond to the decreasing temperature. Thus, even though the motor operates for a long loading time under the same load magnitude, the torque limitation and current limitation may not be performed.

Figure 12:
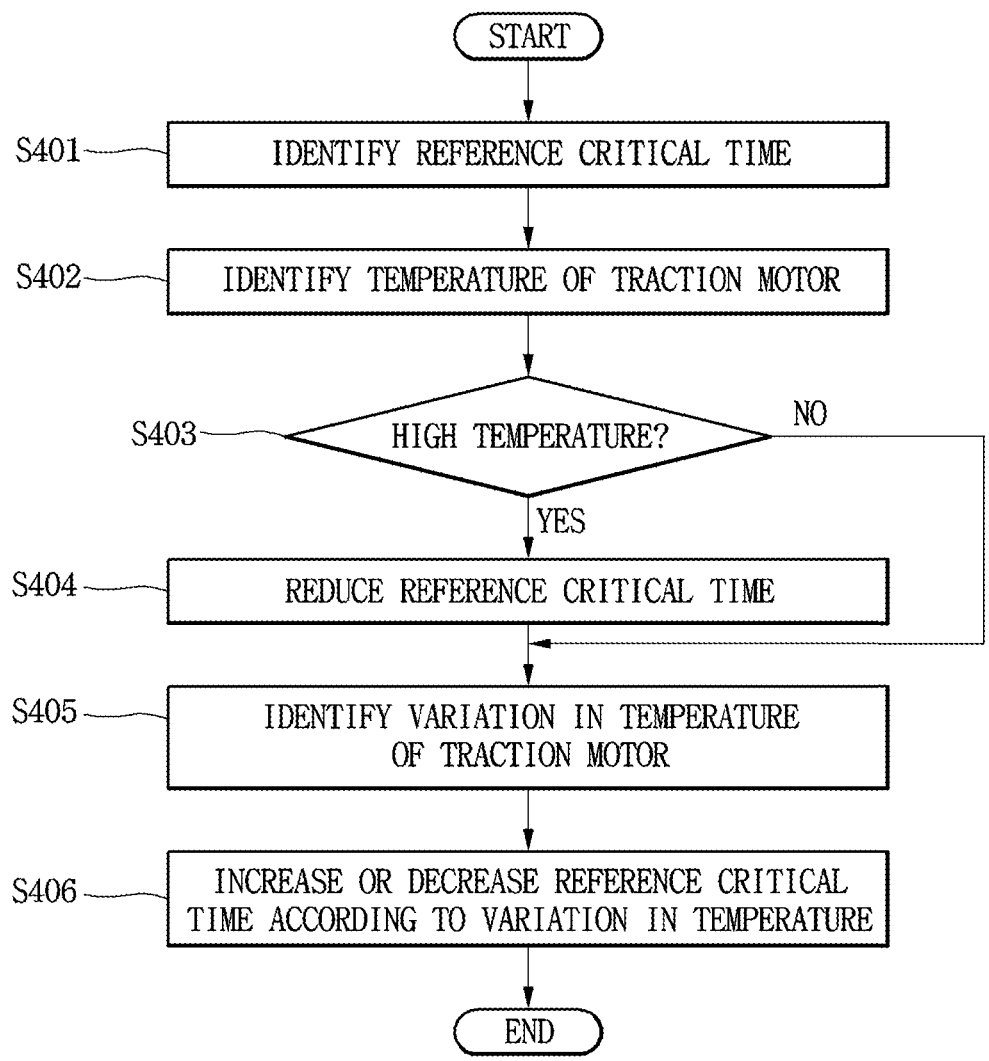
FIG. 12 is a flowchart for explaining a method for determining a critical time according to another embodiment.
Figure 13:
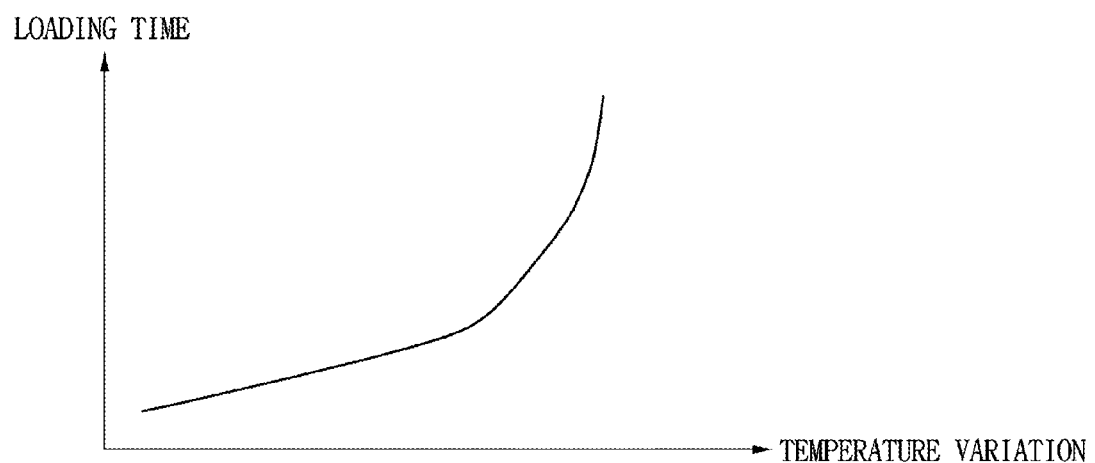
FIG. 13 is a graph of a critical time varying according to a temperature variation.

FIG. 12 is a flowchart for explaining a method for determining a critical time according to another embodiment, and FIG. 13 is a graph of a critical time varying according to a temperature variation.

Referring to FIG. 12, in operation S401, a control unit 160 identifies a reference critical time according to the identified temperature and load magnitude of the motor.

Thereafter, in operation S402, the control unit 160 identifies a temperature of the motor 140.

In operation S403, the control unit 160 determines whether the identified temperature is high or low. The high-temperature and low-temperature conditions may be preset by a manager.

In operation S404, the control unit 160 changes the reference critical time according to the identified temperature.

That is, when the identified temperature is high, the control unit reduces the reference critical time. In inverse case, the reference critical time increases.

Here, in FIG. 8, the torque limitation or current limitation may be performed by the critical time that decreases according to the temperature.

However, in FIG. 12, the reference critical time is finally determined according to the additional condition.

That is, in operation S405, a temperature variation is identified on the basis of the temperature of the motor 140, which is identified at a previous time point and the temperature of the motor 140, which is identified at the present time point.

In operation S406, the control unit 160 additionally increases or decreases the reference critical time according to the temperature variation.

That is, if the temperature variation is significantly reduced, the control unit 160 recognizes a low external temperature. Thus, since a condition in which the motor 140 is naturally cooled is satisfied, the critical time increases.

On the other hand, if the temperature variation increases, the control unit 160 additionally reduces the critical time.

Also, if the temperature variation is very less, and the motor 140 has a high temperature, the possibility in which the temperature of the motor does not decrease is high under the present motor driving conditions. Thus, the control unit 160 additionally reduces the critical time.

According to the embodiments, the driving conditions (the reduction in torque value and current level) may change in consideration of the magnitude of the load and the time for which the load is applied. Thus, the slow response characteristic of the temperature sensor and the overheating of the traction motor due to the erroneous measurement of the temperature sensor may be effectively prevented to more safely protect the traction motor against the overheating.

Also, according to the embodiments, since the torque value is reduced in consideration of the current intensity, the overheating of the traction motor due to the reducing rate of the current intensity, which is significantly less than that of the torque value, may be prevented.

Also, according to the embodiments, since the critical time with respect to the loading time for limiting the output of the traction motor changes according to the temperature of the traction motor and the variation in temperature, the deterioration of the power performance may be maximally restricted, and the operation performance may be improved to improve satisfaction of the driver.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for preventing overheating of a traction motor in an electric vehicle, the method comprising:
   identifying magnitude of an output load of the motor on the basis of an intensity of current flowing in the motor;
   identifying a loading time of the motor on the basis of the identified magnitude of the output load;
   comparing the loading time to a preset critical time corresponding to the identified magnitude of the output load; and
   controlling output torque of the motor according to the comparison result, wherein the controlling of the output torque of the motor comprises:
   determining whether the loading time exceeds the preset critical time
   reducing an output torque value of the motor according to the present load magnitude and a difference between the loading time and the critical time when the loading time exceeds the preset critical time; and
   resetting the output torque value on the basis of an intensity of current flowing in the motor that is driven according to the reduced output torque value.

2. The method according to claim 1,
   wherein the resetting of the output torque value comprises:
   comparing the current intensity at a previous time point to the current intensity at a present time point to identify a decreasing degree of the current intensity;
   identifying a decreasing rate of the reduced output torque value; and
   additionally reducing the output torque value according to a difference between the identified decreasing rate of the output torque value and the identified decreasing degree of the current intensity.

3. The method according to claim 1, further comprising detecting a temperature of the motor,
   wherein the critical time changes according to the detected temperature.

4. The method according to claim 3, wherein the critical time increases or decreases in inverse proportion to the detected temperature.

5. The method according to claim 3, further comprising identifying a variation in temperature of the motor on the basis of a temperature of the motor detected at a previous time point and a temperature of the motor detected at a present time point, wherein the critical time varies according to the temperature detected at the present time point and the identified temperature variation.

6. An apparatus for controlling a motor of an electric vehicle, the apparatus comprising:
   a motor;
   a current sensor configured to detect current supplied to the motor; and
   a control unit configured to:
      identify a magnitude of a load of the motor on the basis of the detected current,
      identify a loading time of the motor on the basis of the identified magnitude of the load,
      compare the loading time to a preset critical time corresponding to the identified magnitude of the load,
      determine whether the loading time exceeds the preset critical time,
      reduce an output torque value of the motor when the loading time exceeds the preset critical time and
      reset the output torque value on the basis of an intensity of current flowing in the motor that is driven according to the reduced output torque value,
   wherein the output torque value is reduced according to the present load magnitude and a difference between the loading time and the critical time.

7. The apparatus according to claim 6, wherein the control unit is further configured to:
   compare the current intensity at a previous time point to the current intensity at a present time point to identify a decreasing degree of the current intensity,
   identify a decreasing rate of the reduced output torque value, and
   additionally reduce the output torque value according to a difference between the identified decreasing rate of the output torque value and the identified decreasing degree of the current intensity.

8. The apparatus according to claim 6, further comprising a temperature sensor detecting a temperature of the motor,
   wherein the control unit is further configured to change the critical time according to the detected temperature.

9. The apparatus according to claim 8, wherein the control unit is further configured to increase or decrease the critical time in inverse proportion to the detected temperature.

10. The apparatus according to claim 8, wherein the control unit is further configured to identify a variation in temperature of the motor on the basis of a temperature of the motor detected at a previous time point and a temperature of the motor is detected at a present time point,
   wherein the critical time varies according to the temperature detected at the present time point and the identified temperature variation.

\* \* \* \* \*